(12) United States Patent
McElroy

(10) Patent No.: US 6,745,497 B2
(45) Date of Patent: Jun. 8, 2004

(54) RETRACTABLE OVERHEAD NOZZLE SYSTEM FOR CAR WASH BLOWER

(75) Inventor: Christopher Patrick McElroy, Glendale, AZ (US)

(73) Assignee: Proto-Vest, Inc., Glendale, AZ (US)

( * ) Notice: Subject to any disclaimer, the term of this patent is extended or adjusted under 35 U.S.C. 154(b) by 0 days.

(21) Appl. No.: 10/280,914

(22) Filed: Oct. 25, 2002

(65) Prior Publication Data

US 2003/0046828 A1 Mar. 13, 2003

Related U.S. Application Data

(63) Continuation-in-part of application No. 09/849,165, filed on May 4, 2001.

(51) Int. Cl.$^7$ ................................................ F26B 19/00
(52) U.S. Cl. ............................ 34/666; 34/229; 34/585
(58) Field of Search ........................ 34/666, 229, 201, 34/202, 216, 217, 222, 223, 224, 209, 418, 585, 582, 639, 640, 641, 642; 15/316.1, 312.2, 405, 302; 141/4; 239/587.1, 587.5, 587.6, 548, 550

(56) References Cited

U.S. PATENT DOCUMENTS

| | | | |
|---|---|---|---|
| 2,440,157 A | 4/1948 | Rousseau | 34/229 |
| 3,279,093 A | 10/1966 | Dutton | 34/229 |
| 3,765,104 A | 10/1973 | Takeuchi | 34/229 |
| 3,780,448 A | * 12/1973 | Von Kulmer | 34/229 |
| 4,393,602 A | * 7/1983 | Smith | 34/34 |
| 4,563,788 A | * 1/1986 | Kobayashi | 15/312 R |
| 4,730,401 A | 3/1988 | Machin | 34/43 |
| 4,872,238 A | * 10/1989 | Crotts et al. | 15/302 |
| 5,367,739 A | 11/1994 | Johnson | 15/316.1 |
| 5,421,102 A | 6/1995 | McElroy et al. | 34/541 |
| 5,596,818 A | 1/1997 | Jones | 34/666 |
| 5,732,723 A | * 3/1998 | Usaka et al. | 134/6 |
| 5,749,161 A | 5/1998 | Jones | 34/541 |
| 5,755,043 A | * 5/1998 | Belanger et al. | 34/666 |
| 5,901,461 A | 5/1999 | McElroy et al. | 34/233 |
| 5,960,564 A | 10/1999 | McElroy et al. | 34/666 |
| 6,282,746 B1 | * 9/2001 | Schleeter | 15/302 |

* cited by examiner

Primary Examiner—K. B. Rinehart
(74) Attorney, Agent, or Firm—Howard & Howard (57) ABSTRACT

An axle (30) supports both a nozzle plenum (18) and a plurality lower tubes (28) that telescope into a plurality of upper tubes (26). The nozzle plenum (18) is moved vertically up and down between various operating positions as the tubes (26, 28) telescope into and out of one another to accommodate the changing longitudinal configuration of a vehicle and the nozzle plenum (18) may be rotated about the axle (30) to efficiently direct air against the contour of the vehicle.

17 Claims, 8 Drawing Sheets

FIG - 9

RETRACTABLE OVERHEAD NOZZLE SYSTEM FOR CAR WASH BLOWER

RELATED APPLICATIONS

This application is a continuation-in-part of application Ser. No. 09/849,165 filed May 4, 2001 and which is now U.S. Pat. No. 6,519,872 which issued on Feb. 18, 2003.

BACKGROUND OF THE INVENTION

1. Field of the Invention

The subject invention relates to an assembly for blowing liquids from the surface of a vehicle in a car wash.

2. Description of the Prior Art

Assemblies for blowing liquids from a vehicle typically include a support plenum for distributing air and a nozzle system including a nozzle for directing air toward the top of a vehicle. Examples of such assemblies are disclosed in U.S. Pat. Nos. 5,421,102; 5,901,461 and 5,960,564, all in the name of McElroy et al and assigned to the assignee of the subject invention.

Many assemblies include an air delivery conduit interconnecting the plenum and the nozzle system for delivering air from the plenum to the nozzle system while allowing the nozzle system to move in an adjustment direction toward and away from the plenum between various vertical-operating positions. Examples of such systems are disclosed in U.S. Pat. No. 2,440,157 to Rousseau and U.S. Pat. No. 3,765,104 to Takeuchi. Yet other assemblies rotate the nozzle to different directions as the vehicle moves therepast. Examples of such assemblies are disclosed in U.S. Pat. Nos. 3,279,093 to Dutton; U.S. Pat. No. 4,730,401 to Machin; U.S. Pat. No. 5,367,739 to Johnson; U.S. Pat. No. 5,596,818 to Jones; and U.S. Pat. No. 5,749,161 to Jones.

An assembly to improve the delivery of air to a vehicle is disclosed and claimed in the aforesaid related application Ser. No. 09/849,165 filed May 4, 2001, now U.S. Pat. No. 6,519,872 granted Feb. 18, 2003. The subject invention is in further perfection of that inventive combination.

SUMMARY OF THE INVENTION AND ADVANTAGES

The invention provides an assembly for blowing liquids from a vehicle comprising a support plenum for distributing air to a nozzle depending from a nozzle plenum for directing air toward the top of a vehicle. An upper tube 26 is movably supported by the support plenum for movement into and out of the support plenum and a lower tube 28 is in telescoping relationship within the interior of the upper tube 26 for delivering air from the support plenum to the nozzle plenum while allowing the nozzle plenum to move vertically in an adjustment direction toward and away from the support plenum between various operating positions. An axle supports the nozzle plenum for rotary movement relative to the lower tube 28 about the axle as the axle extends through the lower tube 28 for raising the nozzle plenum and telescoping the lower tube 28 into the upper tube 26 and the upper tube 26 into the support plenum during vertical movement between the various operating positions. The nozzle plenum may be moved up and down to accommodate the changing longitudinal configuration of a vehicle while the nozzle plenum may be rotated about the axle to efficiently direct air against the contour of the vehicle.

Accordingly, the subject invention provides a unique combination of components that are efficiently manufactured, assembled and operated in a cost-effective manner to provide an effective assembly for removing water from the tops of vehicles.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
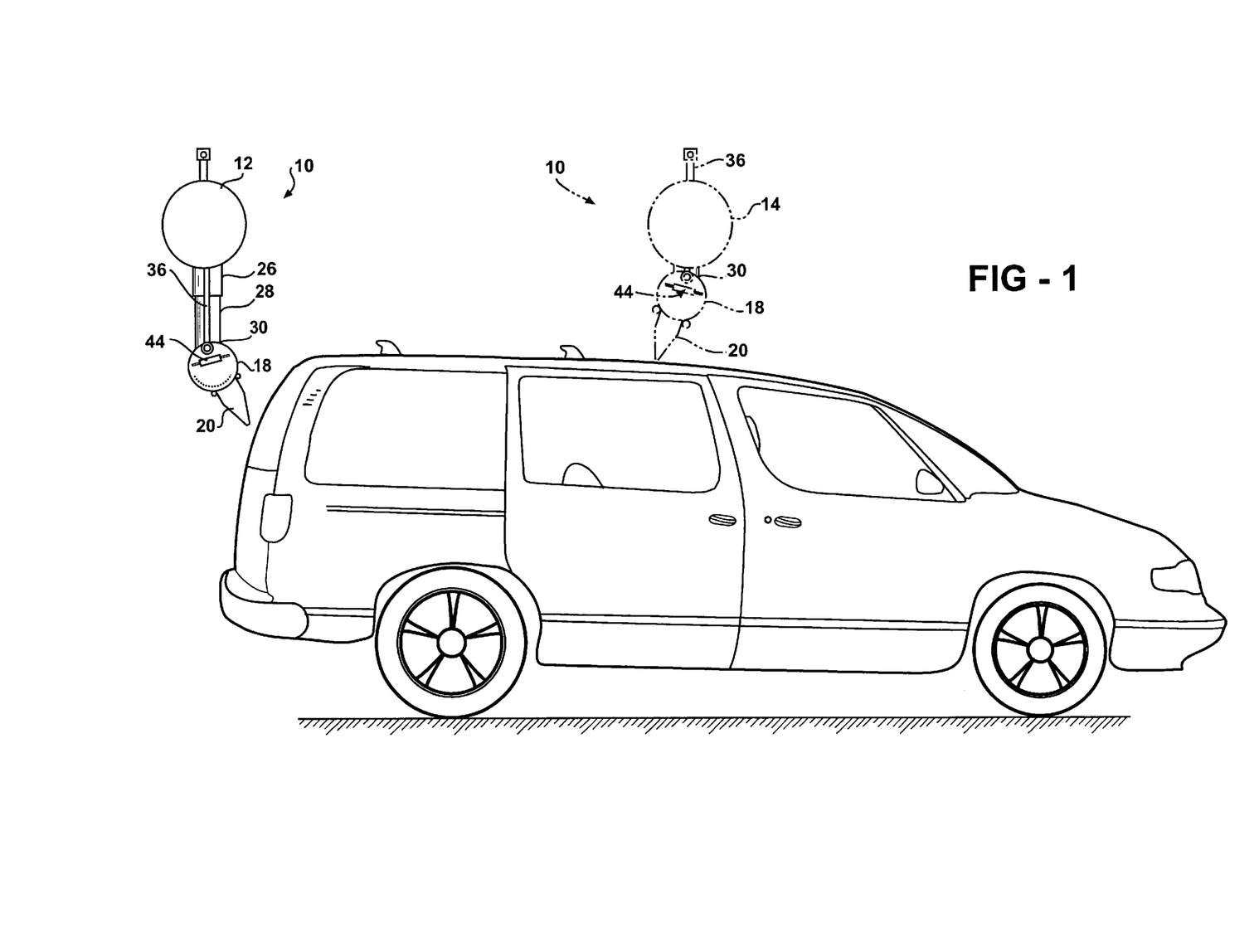
FIG. 1 is an elevational view showing the subject invention blowing water from the rear-end of a vehicle in full lines and from the top of the vehicle in phantom lines.
Figure 2:
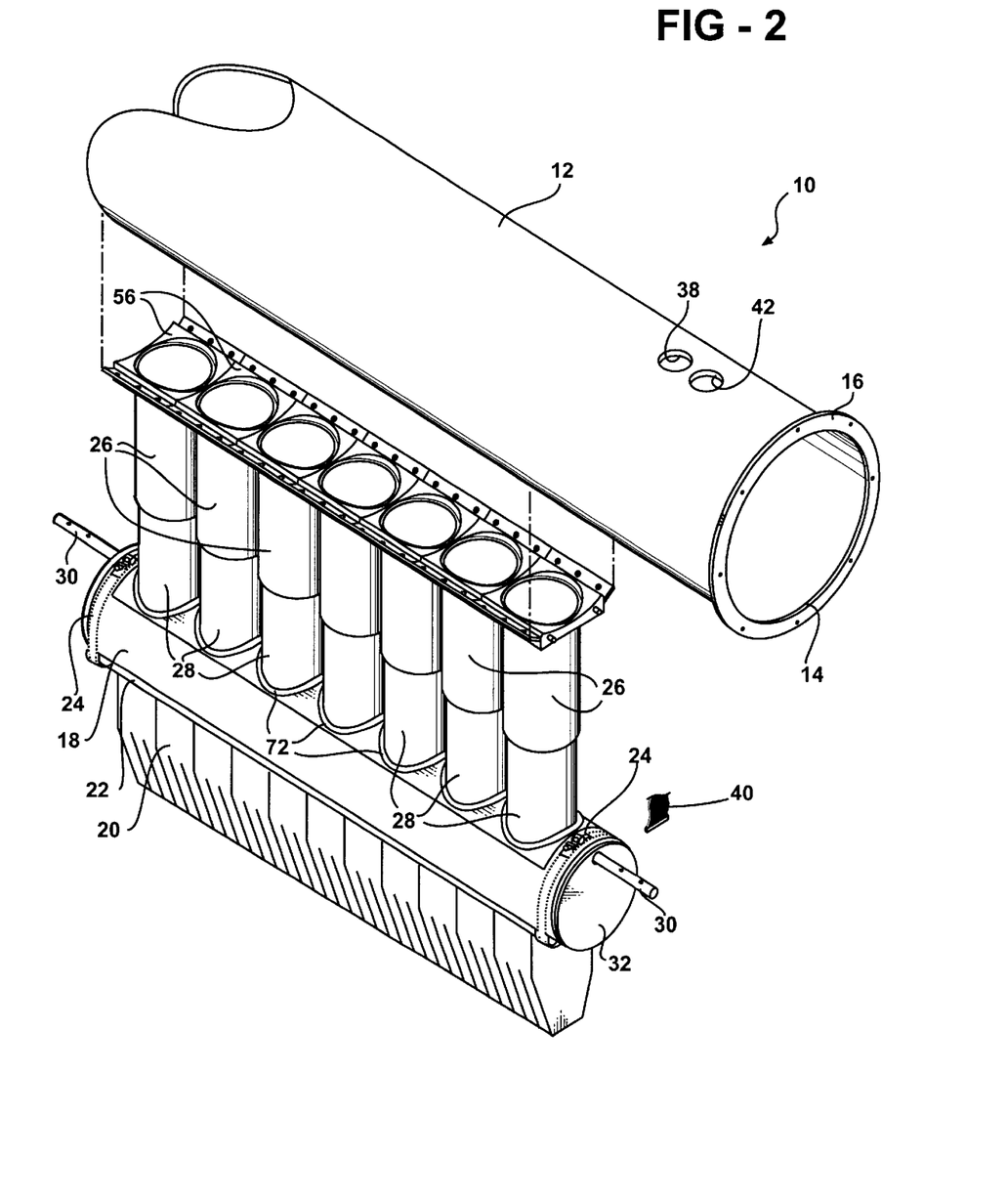
FIG. 2 is a perspective view of the major components of the subject invention.
Figure 3:
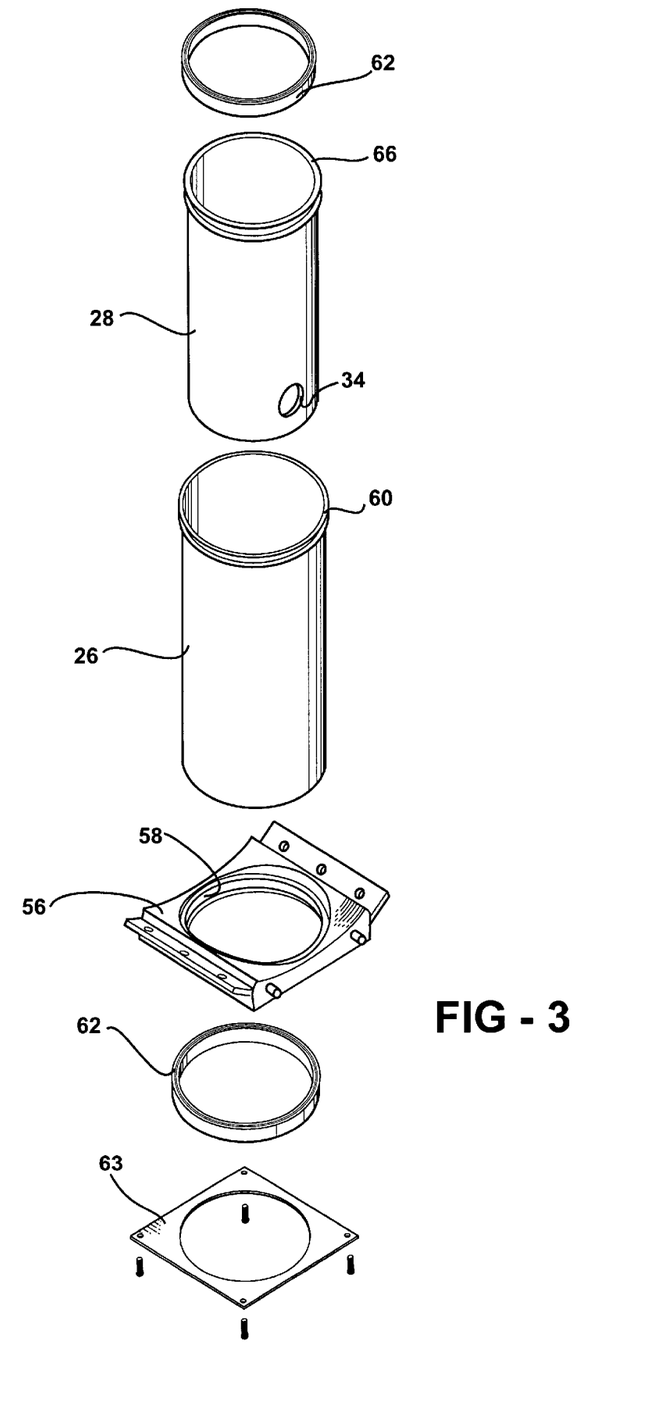
FIG. 3 is an exploded view of the telescoping tube assembly of the subject invention.
Figure 4:
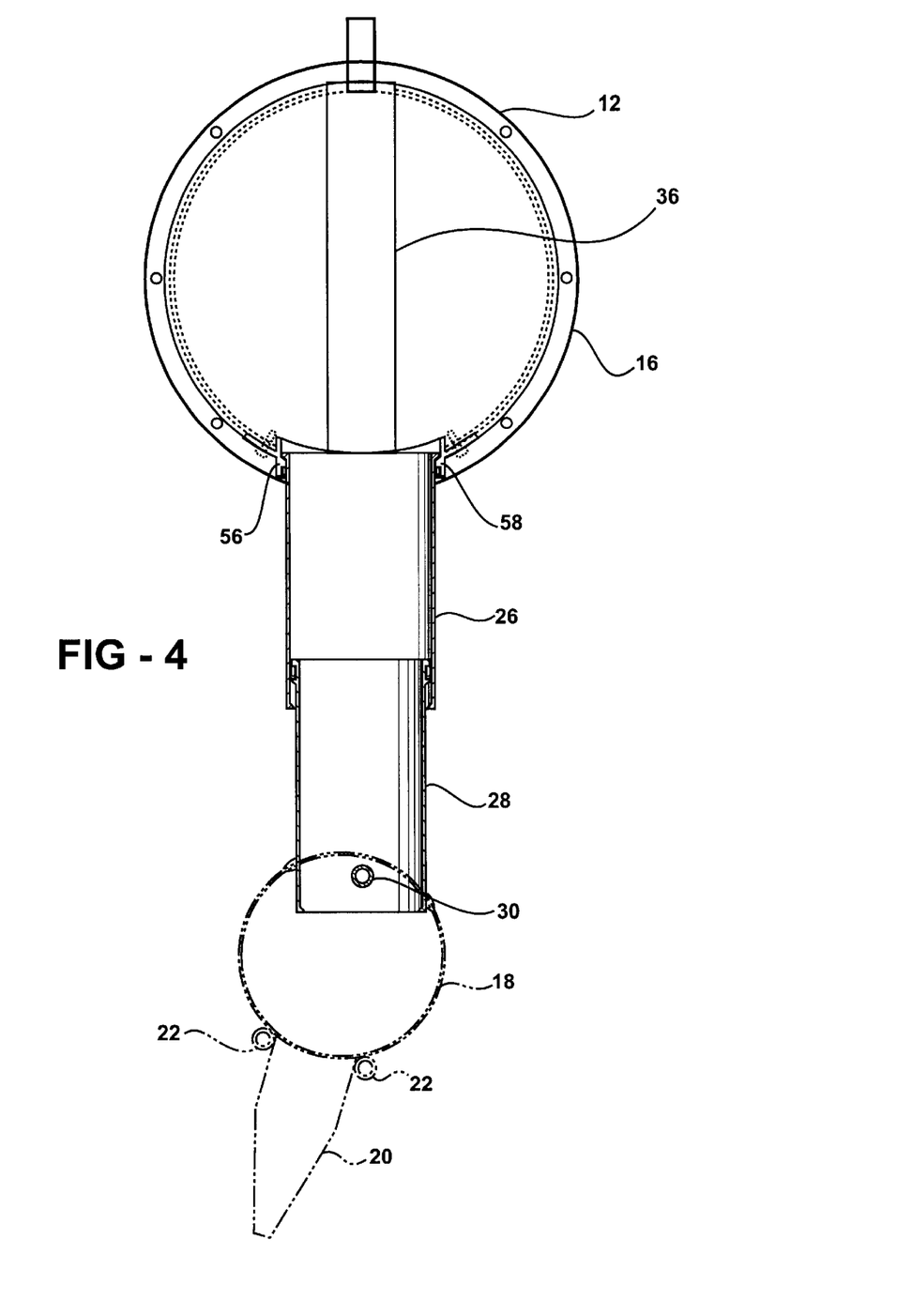
FIG. 4 is a vertical cross sectional view of the components of FIG. 2.

Referring to the Figures, wherein like numerals indicate like or corresponding parts throughout the several views, an assembly for blowing liquids from a vehicle is generally shown at 10 in FIGS. 1 and 2.

The assembly 10 includes a support plenum 12 for distributing air from a blower (not shown). The support plenum 12 is a large tube, e.g., eighteen inches in diameter, and circular in cross section with open ends 14 having flanges 16 for connection to other system ductwork and/or directly to a blower outlet.

The assembly 10 includes a nozzle plenum 18 and a nozzle 20 depending from the nozzle plenum 18 for directing air toward the front, top and rear of a vehicle. The nozzle plenum 18 is elongated with a circular cross section smaller (ten inches) than the support plenum 12. The nozzle 20 is elongated and made of a fabric and is secured to the nozzle plenum 18 by a pair of rods 22 and straps 24 to hold the nozzle 20 about an elongated opening in the bottom of the nozzle plenum 18.

Each of a plurality of upper tubes or cylinders 26 have an interior and are movably supported by the support plenum 12 for movement into and out of the support plenum 12. Each of a plurality of lower tubes or cylinders 28 are in telescoping relationship within the interior of the upper tube 26 for delivering air from the support plenum 12 to the nozzle plenum 18 while allowing the nozzle plenum 18 to move vertically in an adjustment direction toward and away from the support plenum 12 between various operating positions.

An axle 30 supports the nozzle plenum 18 for rotary movement relative to the lower tube 28 about the axis of the axle 30. The axle 30 is a pipe and extends out of closed ends of the nozzle plenum 18, i.e., the ends of the nozzle plenum 18 are closed as by plates 32 and the axle 30 extends through holes in the end plates 32 to rotatably support the nozzle plenum 18. The axle 30 is disposed closer to the top of the circular cross section of the nozzle plenum 18 than to the center of the circular cross section.

In addition, the axle 30 extends through holes 34 in each of the lower tubes 28 telescoping the lower tube 28 into the upper tube 26 and the upper tube 26 into the support plenum 12 while raising the nozzle plenum 18. As the axle 30 supports both the nozzle plenum 18 and the lower tubes 28, the nozzle plenum 18 is moved vertically up and down between various operating positions as the tubes 26, 28 telescope into and out of one another whereby the nozzle plenum 18 may be moved up and down to accommodate the changing longitudinal configuration of a vehicle and the nozzle plenum 18 may be rotated about the axle 30 to efficiently direct air against the contour of the vehicle.

To this end an actuator 36, which includes an pneumatic cylinder housed in the support plenum 12 and having a rod connected to the axle 30 and extending upwardly through openings 38 in the support plenum 12, moves the nozzle plenum 18 vertically between the operating positions. The pneumatic actuator 36 moves the axle 30 downwardly against the biasing action of a biasing system for constantly urging the nozzle plenum 18 toward the support plenum 12 in opposition to gravity and the actuator 36. More specifically, the biasing system includes at least one bungee chord 40 connected to the axle 30 and extending upwardly through openings 42 in the support housing 12. As will be appreciated, the positions of the actuator 36 and the biasing system 40 may be reversed longitudinally along the axle 30.

Figure 8:
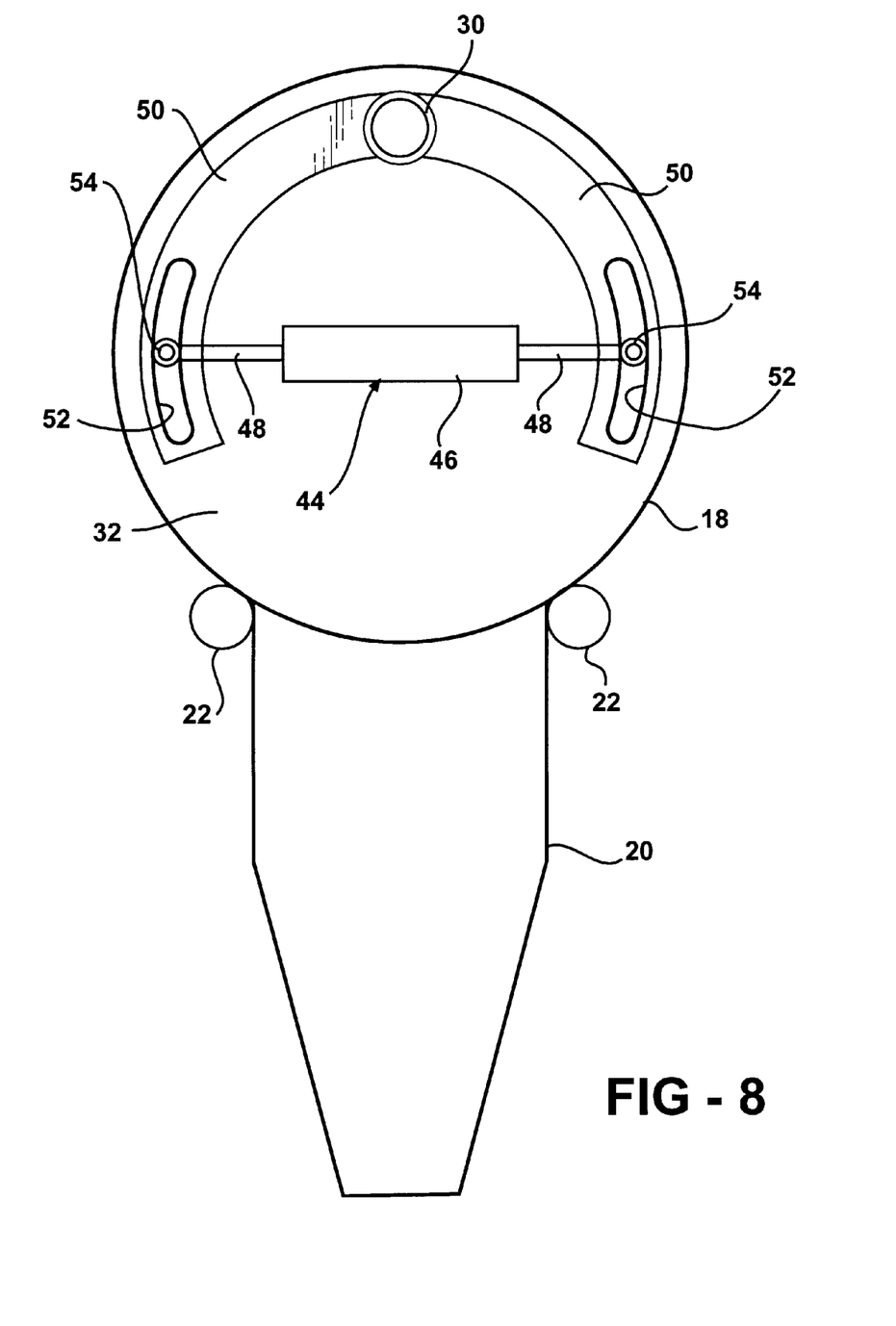
FIG. 8 is an end view of the nozzle plenum showing the rotary drive for rotating the nozzle plenum.
Figure 9:
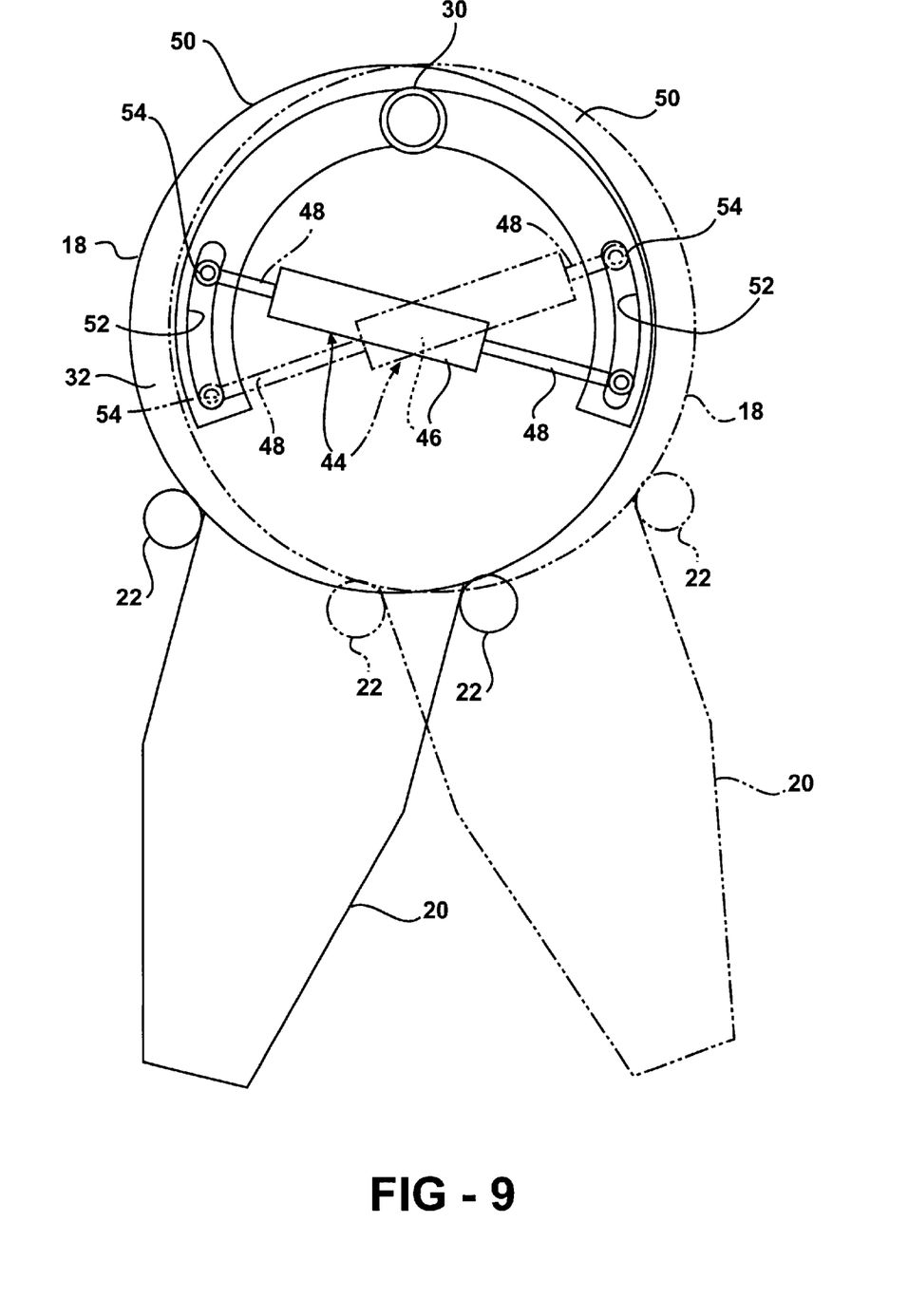
FIG. 9 is a view like FIG. 8 but showing the nozzle plenum rotated clockwise to one extreme in full lines and to the opposite extreme in phantom lines.

The assembly 10 includes a rotary drive, generally indicated at 44, for rotating the nozzle plenum 18 about the axle 30. The rotary drive 44 includes a cylinder 46 supported on one end plate 32 of the nozzle plenum 18 and a rod 48 extending from each of opposite ends of the cylinder 46 with a pair of cams 50 supported by the axle 30 and disposed on opposite sides of the cylinder 46 for reacting with the rods 48. More specifically, the cams 50 are defined by a cam plate having circular slots 52 in an arc about the center of the nozzle plenum 18. The rotary drive 44 also includes a cam follower 54 on the end of each of the rods 48 with one of the cam followers 54 disposed in each of the slots 52. As the cams, i.e., slots 52, are circular they allow the rods 48 to rotate about the center of the nozzle plenum 18 while reacting with the cam slots 52 to rotate the nozzle plenum 18. The nozzle plenum 18 is shown in the central position in FIG. 8 with the rotary drive 44 in the neutral position. However, FIG. 9 shows the plenum nozzle 18 in full lines rotated about the axis of the axle 30 approximately fifteen degrees in the clockwise direction from neutral. In order to effectuate this clockwise movement, the pneumatic cylinder 46 pulls the rod 48 on the left into the cylinder 44 so that the cam follower 54 on the left pulls against the cam slot 52 thereby pulling the cylinder 46 and the nozzle plenum 18 in the clockwise direction to the position shown in full lines. During this clockwise movement, the cam followers 54 move along the cam slots 52 to accommodate the circular movement of the nozzle plenum 18. To rotate the nozzle plenum 18 in the opposite counterclockwise direction, the pneumatic cylinder 46 is actuated to pull the rod 48 on the right side into the cylinder 46. Since the cam plate 50 is fixed to the axle 30, it remains stationary and does not rotate whereby the cylinder 46 and rods 48 react between the nozzle plenum 18 and the axle 30 to effectuate rotation of the nozzle plenum 18 about and relative to the axle 30.

As alluded to above, the nozzle plenum 18 is elongated and a plurality of pairs of the telescoping tubes 26, 28 are disposed in side by side relationship along the nozzle plenum 18. For each pair of telescoping tubes 26, 28 there is included a tube support plate 56 secured to the support plenum 12 and defining a support hole extending into the support plenum 12. The support plate 56 presents an upper-tube support-flange 58 extending radially into the support hole and the upper tube 26 has an upper end defining an upper tube hanger flange 60 extending radially outwardly and radially overlapping the support flange 58 for limiting downward movement of the upper tube 26 relative to the support plate 56. The upper tube support-flange 58 includes an upper seal recess in the support hole and an upper u-shaped seal 62 (FIG. 5) is disposed in the recess and engages the upper tube 26 for sealing the upper tube 26 to the support-flange 58 of the support plate 56. A seal plate 63 is attached to the bottom of the support plate 56 to retain ands/or cover the upper seal 62.

Figure 5:
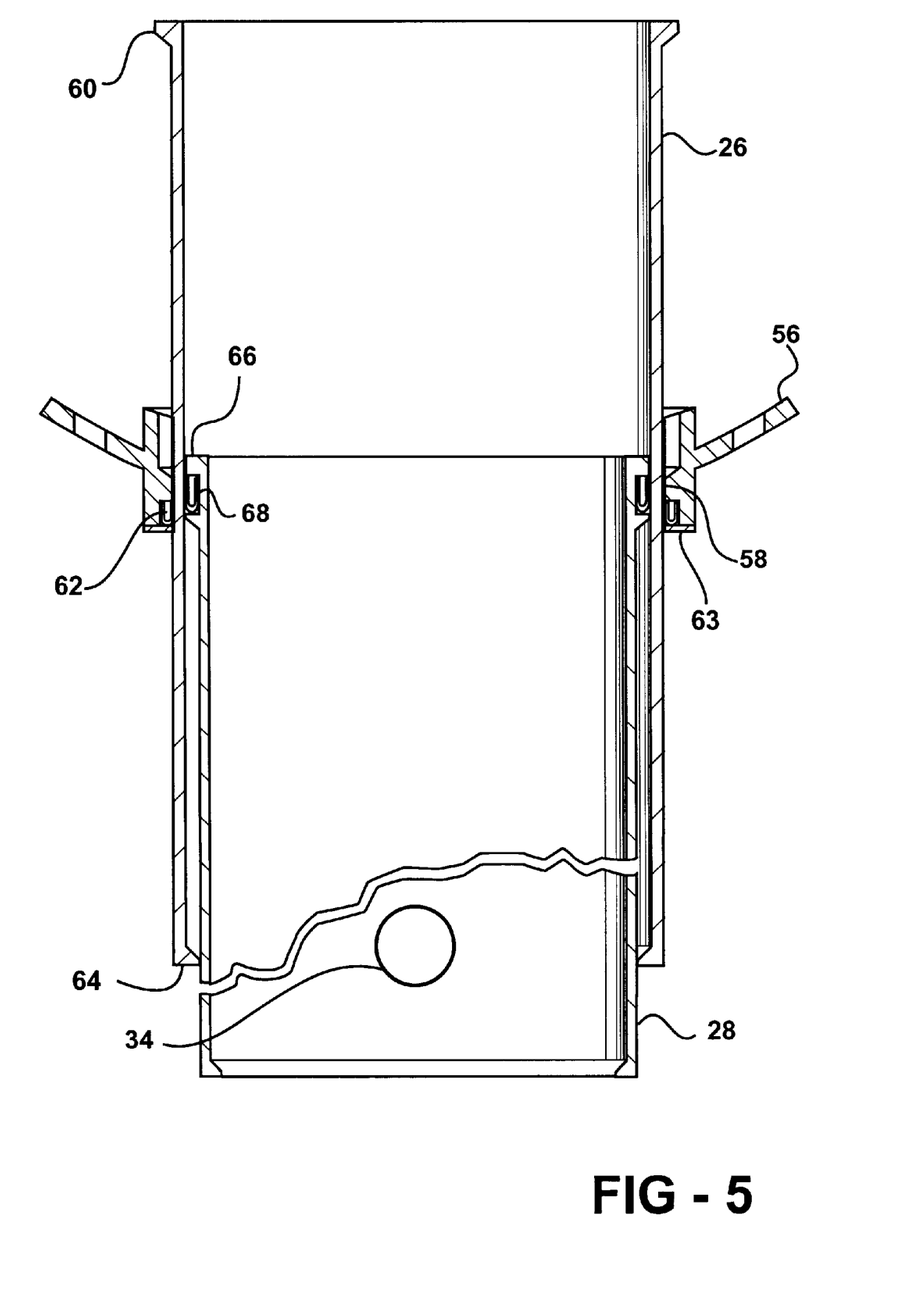
FIG. 5 is an enlarged cross sectional view of a pair of telescoping tubes of the subject invention.

As shown in FIG. 5, the upper tube 26 has a lower end presenting a radially inwardly extending lower tube support flange 64 and the lower tube 28 has an upper end defining a lower tube hanger flange 66 extending radially outwardly and radially overlapping the lower tube support flange 64 for limiting downward movement of the lower tube 28 relative to the upper tube 26. The lower tube support flange 64 includes a lower seal recess surrounding the upper tube 26 and a lower seal 68 disposed in the lower seal recess and engaging the lower tube 28 for sealing the lower tube 28 to the upper tube 26.

Figure 6:
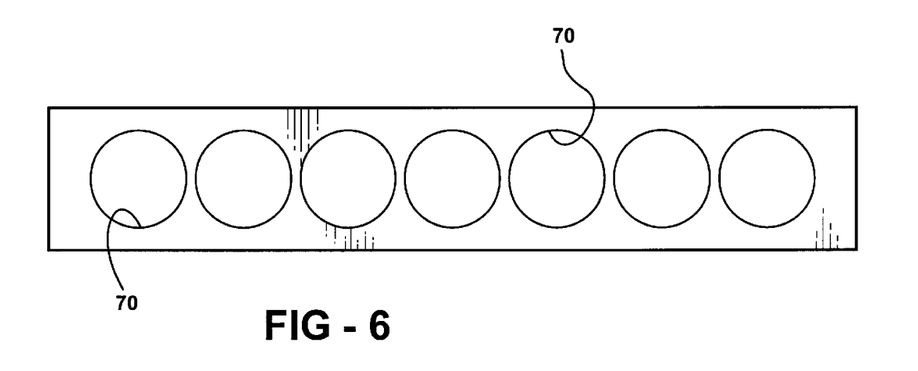
FIG. 6 is a top view of the nozzle plenum of at the lower end of the telescoping tubes.
Figure 7:
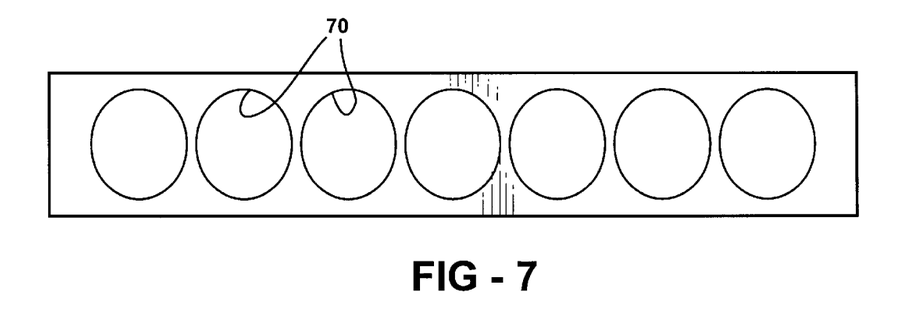
FIG. 7 is a view of the tube holes shown in FIG. 6 in the top of the nozzle plenum but with the nozzle plenum flattened into a plane.

Since the telescoping tubes 26, 28 have circular cross sections, the circular nozzle plenum 18 has an oval shaped holes 70 therein surrounding the lower tubes 28. This is illustrated in FIGS. 6 and 7 wherein FIG. 6 is a top view showing the curved upper surface of the nozzle plenum 18 whereas FIG. 7 shows the nozzle plenum unwrapped into a flat plane thereby showing the true flat oval configuration of the holes in the nozzle plenum to accommodate the circular lower tubes 28. A seal is disposed about the periphery of each of the oval holes in the nozzle plenum 18 and engages the lower tubes 28 for sealing the nozzle plenum 18 to the lower tubes 28 during rotary movement of the nozzle plenum 18 relative to the lower tubes 28 about the axle 30.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. An assembly for blowing liquids from a vehicle comprising;

a support plenum (12) for distributing air, a nozzle plenum (18), a nozzle (20) depending from said nozzle plenum (18) for directing air toward a vehicle, an upper tube (26) having an interior and movably supported by said support plenum (12) for movement into and out of said support plenum (12) and a lower tube (28) in telescoping relationship within said interior of said upper tube (26) for delivering air from said support plenum (12) to said nozzle plenum (18) while allowing said nozzle plenum (18) to move vertically in an adjustment direction toward and away from said support plenum (12) between various operating positions, an axle (30) supporting said nozzle plenum (18) for rotary movement relative to said lower tube (28) about said axle (30), said axle (30) extending through said lower tube (28) for raising said nozzle plenum (18) and telescoping said lower tube (28) into said upper tube (26) and said upper tube (26) into said support plenum (12) during vertical movement between said various operating positions whereby said nozzle plenum (18) may be moved up and down to accommodate the changing longitudinal configuration of a vehicle and said nozzle plenum (18) may be rotated about said axle (30) to efficiently direct air against the contour of the vehicle.

2. An assembly as set forth in claim 1 including a seal between said nozzle plenum (18) and said lower tube (28) for sealing said nozzle plenum (18) to said lower tube (28) during rotary movement of said nozzle plenum (18) relative to said lower tube (28) about said axle (30).

3. An assembly as set forth in claim 2 wherein said nozzle plenum (18) has a circular cross section.

4. An assembly as set forth in claim 3 wherein said axle (30) is disposed closer to the top of said circular cross section than to the center of said circular cross section.

5. An assembly as set forth in claim 4 wherein said tubes have circular cross sections and said circular nozzle plenum (18) has an oval shaped hole therein surrounding said lower tube (28).

6. An assembly as set forth in claim 5 wherein said seal is disposed about the periphery of said hole and engages said lower tube (28).

7. An assembly as set forth in claim 6 wherein said nozzle plenum (18) is elongated and including a plurality of said pairs of said telescoping tubes (26, 28) disposed in side by side relationship along said nozzle plenum (18).

8. An assembly as set forth in claim 2 including a tube support plate (56) secured to said support plenum (12) and defining a support hole extending into said support plenum (12) and presenting an upper tube support-flange (58) extending radially into said support hole, said upper tube (26) having an upper end defining an upper tube hanger flange (60) extending radially outwardly and radially overlapping said support-flange (58) for limiting downward movement of said upper tube (26) relative to said support plate (56).

9. An assembly as set forth in claim 8 wherein said upper tube support-flange (58) includes an upper seal recess in said support hole and an upper seal disposed in said recess and engaging said upper tube (26) for sealing said upper tube (26) to said support-flange (58) of said support plate (56).

10. An assembly as set forth in claim 8 wherein said upper tube (26) has a lower end presenting a radially inwardly extending lower tube support flange (64) and said lower tube (28) has an upper end defining a lower tube hanger flange (66) extending radially outwardly and radially overlapping said lower tube support flange (64) for limiting downward movement of said lower tube (28) relative to said upper tube (26).

11. An assembly as set forth in claim 10 wherein said lower tube support flange (64) includes a lower seal recess surrounding said upper tube (26) and a lower seal (68) disposed in said lower seal recess and engaging said lower tube (28) for sealing said lower tube (28) to said upper tube (26).

12. An assembly as set forth in claim 2 including a rotary drive (44) for rotating said nozzle plenum (18) about said axle (30).

13. An assembly as set forth in claim 12 wherein said rotary drive (44) includes a cylinder (46) supported on one end of said nozzle plenum (18), a rod (48) extending from each of opposite ends of said cylinder (46), a pair of cams (50) supported by said axle (30) and disposed on opposite sides of said cylinder (46) for reacting with said rods (48).

14. An assembly as set forth in claim 13 wherein said nozzle plenum (18) has a circular cross section and said cams (50) are circular for allowing said rods (48) to rotate about the center of said nozzle plenum (18) while reacting with said cams (50) to rotate said nozzle plenum (18).

15. An assembly as set forth in claim 14 including a cam plate having circular slots (52) in an arc about the center of said nozzle plenum (18) to define said cams (50), a cam follower (54) on the end of each of said rods (48) with one of said cam follower (54) is disposed in each of said slots.

16. An assembly as set forth in claim 2 including an actuator (36) for moving said nozzle plenum (18) vertically between said operating positions.

17. An assembly as set forth in claim 16 including a biasing system (40) for constantly urging said nozzle plenum (18) toward said support plenum (12) in opposition to gravity and said actuator (36).

* * * * *